United States Patent [19]

Kenyon et al.

[11] Patent Number: 5,473,053
[45] Date of Patent: Dec. 5, 1995

[54] MAGENTA POLY-AZO COMPOUNDS

[75] Inventors: Ronald W. Kenyon, Failsworth; Prahalad M. Mistry, Ashton-Under-Lyne, both of United Kingdom

[73] Assignee: Zeneca Limited, London, England

[21] Appl. No.: 178,869

[22] Filed: Jan. 7, 1994

[30] Foreign Application Priority Data

Jan. 12, 1993 [GB] United Kingdom ............. 9300438
Apr. 8, 1993 [GB] United Kingdom ............. 9307478

[51] Int. Cl.$^6$ .................... C09B 62/09; C09B 62/03; C09B 33/10; C09D 11/02
[52] U.S. Cl. ............... 534/634; 534/605; 534/728; 534/797; 106/22 K
[58] Field of Search ................ 534/634, 728, 534/797, 605; 106/22 K

[56] References Cited

U.S. PATENT DOCUMENTS

| | | | |
|---|---|---|---|
| 4,584,367 | 4/1986 | Matsuo et al. | 534/634 |
| 5,262,527 | 11/1993 | Gregory et al. | 534/797 |
| 5,279,656 | 1/1994 | Kenyon et al. | 106/22 H |

FOREIGN PATENT DOCUMENTS

| | | |
|---|---|---|
| 599316 | 5/1978 | Switzerland . |
| 1405016 | 3/1973 | United Kingdom . |

*Primary Examiner*—Johann Richter
*Assistant Examiner*—Fiona T. Powers
*Attorney, Agent, or Firm*—Cushman Darby & Cushman

[57] ABSTRACT

A compound of Formula (1) and salts thereof:

$$Ar^1N=N-J-X-L-X-J-N=NAr^2 \quad (1)$$

wherein:

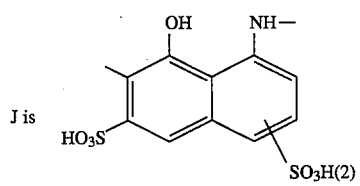

J is $Ar^1$ and $Ar^2$ are each independently aryl containing at least two carboxy groups; and
L is a group of the Formula (3a) or (3b):

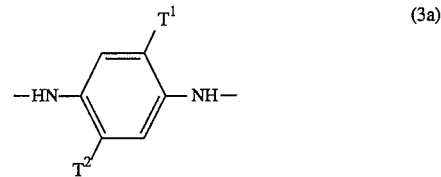

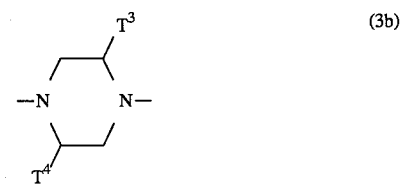

in which
$T^1$ and $T^2$ each independently is $C_{1-4}$-alkyl, $C_{1-4}$-alkoxy or $C_{3-4}$-alkenyl;
$T^3$ and $T^4$ each independently is H, $C_{1-4}$-alkyl, $C_{1-4}$-alkoxy or $C_{3-4}$-alkenyl provided that $T^3$ and $T^4$ are not both H;
each X independently is a group of the Formula (4), (5) or (6):

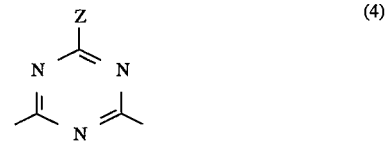

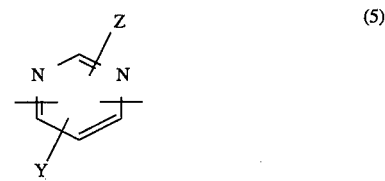

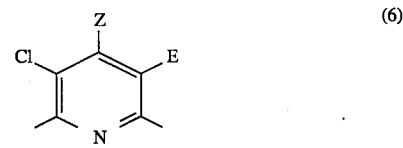

each Z independently is H, halogen, alkyl, $NR^1R^2$, $SR^3$ or $OR^3$;
each Y independently is Z, $SR^4$ or $OR^4$;
each E independently is Cl or CN; and
$R^1$, $R^2$, $R^3$ and $R^4$ are each as defined in the specification.

A compound of Formula (1) is suitable for use in the coloration of cellulosic substrates, such as paper, to give bright prints with good light and water fastness. It is especially suitable for use in the printing of paper by non-impact printing techniques, such as ink jet printing, especially thermal ink jet printing.

16 Claims, No Drawings

MAGENTA POLY-AZO COMPOUNDS

The specification describes an invention relating to azo compounds which are useful as the colorants for inks, especially inks used in ink jet printing.

According to the present invention there is provided a compound of Formula (1) and salts thereof:

$$Ar^1N=N-J-X-L-X-J-N=NAr^2 \quad (1)$$

wherein:

J is

[structure: naphthalene with OH, NH—, CH$_3$, HO$_3$S, and SO$_3$H(2) substituents]

$Ar^1$ and $Ar^2$ are each independently aryl containing at least two carboxy groups; and L is a group of the Formula (3a) or (3b):

[structure (3a): phenylene with $T^1$, $T^2$ substituents and two —HN— and —NH— linkages]

[structure (3b): piperazine ring with $T^3$ and $T^4$ substituents and two —N linkages]

in which $T^1$ and $T^2$ each independently is $C_{1-4}$-alkyl, $C_{1-4}$-alkoxy or $C_{3-4}$-alkenyl; and $T^3$ and $T^4$ each independently is H, $C_{1-4}$-alkyl, $C_{1-4}$-alkoxy or $C_{3-4}$-alkenyl provided that $T^3$ and $T^4$ are not both H;

each X independently is a group of the Formula (4), (5) or (6):

[structure (4): triazine ring with Z substituent]

[structure (5): triazine with Z and Y substituents]

[structure (6): pyridine-type ring with Cl, Z, E substituents]

each Z independently is H, halogen, alkyl, $NR^1R^2$, $SR^3$ or $OR^3$;

each Y independently is Z, $SR^4$ or $OR^4$;

each E independently is Cl or CN; and $R^1$, $R^2$, $R^3$ and $R^4$ are each independently H, alkyl, substituted alkyl, alkenyl, substituted alkenyl, cycloalkyl, aryl, substituted aryl, aralkyl, substituted aralkyl or $R^1$ and $R^2$ together with the nitrogen atom to which they are attached form a 5 or 6 membered ring;

It is preferred that the dye of Formula (1) has at least as many carboxy groups as sulpho groups.

Each of the groups $Ar^1$ and $Ar^2$ is preferably naphthyl or phenyl, especially phenyl which may carry further substituents in addition to the two carboxy groups. The additional substituents are preferably selected from alkyl, especially $C_{1-4}$-alkyl; alkoxy, especially $C_{1-4}$-alkoxy; —SO$_3$H; —PO$_3$H$_2$; —COSH; —OH; —CO$_2$H; halogen, especially Cl or Br; and optionally substituted $C_{1-4}$-alkyl. However, it is preferred that each of $Ar^1$ and $Ar^2$ carries only two carboxy groups, and is more preferably dicarboxyphenyl, such as 2,4-dicarboxyphenyl, 2,3-dicarboxyphenyl, 3,4-dicarboxyphenyl, and especially 3,5-dicarboxyphenyl. It is also preferred that $Ar^1$ and $Ar^2$ are identical.

It is preferred that the chromophores $Ar^1N=N-J-$ and $Ar^2N=N-J-$ are identical or similar so that they absorb light at approximately the same wavelength.

The variable —SO$_3$H group in each J, which may be meta- or para- with respect to the NH group, is preferably in the meta-position, so that J is the divalent residue of H-acid.

Examples of the alkyl, alkoxy and alkenyl groups represented by $T^1$, $T^2$, $T^3$ and $T^4$ in the divalent group L are methyl ethyl isopropyl, n-propyl, n-butyl, isobutyl, t-butyl, methoxy, ethoxy, n-propoxy, isopropoxy, n-butoxy, iso-butoxy, t-butoxy and allyl. In the group of Formula (3a), $T^1$ and $T^2$ are preferably identical more preferably $C_{1-4}$-alkyl and, especially, each is methyl, so that L is especially 2,5-dimethylphen-1,4-ylene-diamino. In the group of Formula (3b), $T^3$ is preferably H or $C_{1-4}$-alkyl, especially methyl and $T^4$ is preferably H or $C_{1-4}$-alkyl, especially methyl (provided $T^3$ and $T^4$ are not both H) and L is especially 2,5-dimethylpiperazin-1,4-ylene or 2-(5-methylpiperazin-1,4-ylene.

When X is of Formula (5) it is preferred that Z is attached to the carbon atom between the two ring nitrogen atoms and that Y is para to Z. Each X is preferably of Formula (4).

Z is preferably Cl, $OR^3$, $SR^3$ or $NR^1R^2$, especially Cl; OH; SH; alkoxy, such as methoxy or ethoxy; hydroxy—$C_{2-4}$-alkylamino, such as mono or di-(2-hydroxyethyl)amino; morpholinyl; piperidinyl; piperazinyl; 4-(hydroxy-$C_{2-4}$-alkyl)-piperazin-1-yl, such as 4-hydroxyethylpiperazin-1-yl; 4-($C_{1-4}$-alkyl) piperazin-1-yl, such as 4-methylpiperazin-1-yl; $C_{1-6}$-alkylamino, such as dimethylamino, n-butylamino or n-hexylamino; carboxy-$C_{1-4}$-alkylamino, such as 2-carboxymethylamino; arylamino, such as phenylamino, mono-3- or di-3,5-carboxyanilino; or aralkylamino, such as benzylamino, mono-3- or di-3,5-carboxyphenylmethylamino. Where Z is alkyl or alkoxy these preferably contain from 1 to 4 carbon atoms. Where at least one Z is halogen, the compound of Formula (1) may be reactive with cellulose under appropriate temperature and pH conditions. However, this does not appear to contribute to the wet-fastness of the compound when applied to a paper substrate under the normal conditions used in ink jet printing and compounds in which Z is not a cellulose reactive group have been found to give equally wet-fast prints on paper to those in which Z is a cellulose reactive group.

Each of $R^1$, $R^2$, $R^3$ and $R^4$ independently is preferably selected from H, $C_{1-10}$-alkyl especially $C_{1-4}$-alkyl, substituted $C_{1-10}$-alkyl especially substituted $C_{1-4}$-alkyl, phenyl, substituted phenyl, $(CH_2)_{1-4}$-phenyl and substituted $(CH_2)_{1-4}$-phenyl especially benzyl and substituted benzyl. When any one of $R^1$, $R^2$, $R^3$ or $R^4$ is substituted, the substituent is preferably selected from —OH, —CH$_3$, —OCH$_3$, —SO$_3$H and —CO$_2$H. When $R^1$ and $R^2$ together with the nitrogen radical to which they are attached form a 5- or 6-membered ring, this is preferably morpholine, piperidine or piperazine especially the latter in which the free ring N-atom may be, and preferably is, substituted by a $C_{1-4}$-alkyl or hydroxy-$C_{2-4}$-alkyl group.

The present invention relates not only to a compound of Formula (1) in the free acid form, but also to a salt thereof, especially an alkali metal, ammonium or substituted ammonium salt. Although Formulae (4), (5) and (6) are represented in neutral form, the present invention also covers quaternised forms thereof, particularly where the compound of Formula (1) is in zwitterionic form.

Especially preferred compounds of the present invention are those of Formula (1) in the form of ammonium, methylammonium or dimethylammonium salts in which $Ar^1$ and $Ar^2$ are both 3,5-dicarboxyphenyl; each J is of Formula (2) in which the sulpho groups are in the 3,6-positions; each X is of Formula (4) in which Z is Cl, $NR^1R^2$ or $OR^3$ and L is 2,5-dimethylphen1,4-ylenediamino, 2-methylpiperazin1,4-ylene or 2,5-dimethylpiperazin1,4-ylene. In such a compound of Formula (1) it is especially preferred that Z is halogen, especially Cl; OH; $C_{1-4}$-alkoxy, especially methoxy; hydroxy-$C_{2-4}$-alkylamino, especially 2-hydroxyethylamino; morpholin-1-yl; piperidin-1-yl; piperazin-1-yl; 4-($C_{1-4}$-alkyl)piperazin-1-yl and 4-(hydroxy-C2-4-alkyl)-piperazin-1-yl.

According to a further aspect of the present invention there is provided a process for the preparation of a compound of Formula (1) comprising (i) diazotisation of amines $Ar^1NH_2$ and $Ar^2NH_2$ with a diazotising agent such as $HNO_2$, in the cold and preferably below 5° C. to give the corresponding diazonium salts;

(ii) condensation of HJH with a compound halo-X-halo, preferably cyanuric chloride, preferably in the presence of base, to give a compound, HJ—X-halo, in which X is as defined above except that Z is Cl;

(iii) coupling each of the diazonium salts from (i) above with an equivalent of a compound, HJ—X-halo to give compounds, $Ar^1N=N$—J—X-halo and $Ar^2N=N$—J—X-halo, in which each X is the same or different to each other and in which each X is as defined above except that Z is Cl;

(iv) the products from (iii) are each condensed with a diamine, H—L—H;

(v) optionally condensing the product from (iv) with a compound, ZH, preferably in the presence of base;

wherein $Ar^1$, $Ar^2$, J, X, L and Z are as defined above unless otherwise stated.

Examples of amines, $Ar^1NH_2$ and $Ar^2NH_2$, which may be used in the preparation of compounds of Formula (1), are, 2-aminoisophthalic acid, 4-aminoisophthalic acid, 5-aminoisophthalic acid, 3-aminophthalic acid, 4-aminophthalic acid and 2-aminoterephthalic acid.

The divalent group J may be derived from H-acid or K-acid, but preferably from the former. The two groups represented by J may be the same or different.

Each group X is preferably derived from cyanuric chloride and the free halogen atom in the group of formula (4), may be subsequently replaced with a different group, Z.

A compound of Formula (1) is suitable for use as a colorant especially for cellulosic substrates and gives a good strong magenta shade on paper and related cellulosic substrates, especially those having a surface pH below 7, with especially good light- and wet-fastness properties. However some of the present compounds have been found to give prints having a high water-fastness on substrates with a surface pH of 7 or above. For example, the dye of Example 5 gives a high wet-fast print on an alkaline paper (Xerox Hammermill 4DP). The brightness of shade, and often the wet-fastness, of a print on paper of a compound of Formula (1) is significantly better than that given by an equivalent of the compound of Formula (1) in which the group L is replaced by a different phen-1,4-ylene-diamino or piperazin-1,4-ylene group not containing an alkyl, alkoxy or alkenyl group in one or both of the 2- and 5-positions.

The compounds of Formula (1) are especially useful as colorants in inks, especially aqueous inks, used in ink jet printing and particularly thermal ink jet printing and according to a further feature of the present invention there is provided an ink, especially an ink jet printing ink, comprising a compound of Formula (1) (hereinafter referred to as the colorant) in a liquid medium.

The water fastness of the colorant on paper is increased if it is printed from an aqueous medium in the form of an ammonium or substituted ammonium salt, especially such a salt derivable from ammonia or a volatile amine. Preferred volatile amines have a vapour pressure of less than 60 mm Hg, more preferably less than 20 mm Hg, at 20° C. and atmospheric pressure. Examples of preferred volatile amines include methylamine, dimethylamine, diethylamine, methylethylamine, propylamine and isopropylamine.

Preferred alkali metal salts are the sodium, potassium and lithium salts, and mixtures thereof with $NH_4^+$ or other substituted ammonium ions derivable from the volatile amines.

The substituted ammonium salt may contain a cation of the formula $^+NQ_4$ in which each Q independently is an organic radical, or two or three Qs together with the nitrogen atom to which they are attached form a heterocyclic ring and all remaining Qs are selected from $C_{1-4}$-alkyl. Preferred organic radicals represented by Q are $C_{1-4}$-alkyl radicals, especially methyl radicals. Preferred heterocyclic rings formed by $NQ_4$ are 5- or 6-membered heterocyclic rings.

As examples of substituted ammonium cations of formula $^+NQ_4$ there may be mentioned $N^+(CH_3)_4$, $N^+(CH_2CH_3)_4$, N-methylpyridinium, N,N-dimethylpiperidinium and N,N-dimethylmorpholinium.

Preferably the substituted ammonium salt contains a cation of the formula $^+NHG_3$ wherein each G independently is H or $C_{1-4}$-alkyl provided at least one G is $C_{1-4}$-alkyl, or two or three groups represented by G together with the nitrogen atom to which they are attached form a 5- or 6-membered ring, especially a pyridine, piperidine or morpholine ring. It is preferred that the substituted ammonium cation is derived from a preferred volatile amine as hereinbefore defined.

As examples of substituted ammonium cations of formula $^+NHG_3$ there may be mentioned $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $CH_3CH_2CH_2N^+H_3$, $(CH_3)_2CHN^+H_3$, isopropylammonium, pyridinium, piperidinium and morpholinium. Examples of amines used to form such salts include methylamine, dimethylamine, trimethylamine, ethylamine, n-propylamine, iso-propylamine, n-butylamine, iso-butylamine, sec-butylamine, tert-butylamine, piperidine, pyridine, morpholine, allylamine, diethylamine, triethylamine and mixtures thereof. It is not essential that the colorants are completely in the form of the ammonium or substituted ammonium salt and mixed alkali metal and either ammonium or substituted ammonium salts are effective, especially those in which at least 50% of the cations are ammonium or substituted ammonium ions.

If the natural pH value of the paper surface is significantly above pH 6, this can be adjusted downwards, by the addition to the ink of a salt of an acid with a volatile base, such as ammonia. When the ink dries the base evaporates to leave the free acid which will lower the pH of the paper surface in the region of the dye. To minimise damage to the paper it is preferred to use a weak acid, such as acetic acid.

Suitable ink jet printing inks generally contain from 0.5% to 20% preferably from 1% to 10% and especially from 1% to 6% by weight of the colorant and are generally maintained at a pH from 5 to 9, especially from 6 to 8 which favours solubility of the colorant in the solvent medium while minimising attack upon the print head or pen.

Suitable liquid media include water alone and mixtures of water with various water-soluble or water-miscible organic solvents.

The liquid medium is preferably water or an aqueous medium comprising a mixture of water and one or more water-soluble organic solvents, preferably in a weight ratio of water to the solvent(s) from 99:1 to 1:99, more preferably from 95:5 to 50:50 and especially from 90:10 to 60:40.

The water-soluble organic solvent is preferably a $C_{1-4}$-alkanol such as methanol, ethanol, n-propanol, isopropanol, n-butanol, sec-butanol, tert-butanol or isobutanol; an amide such as dimethylformamide or dimethylacetamide; an ester such as diacetine; a ketone or ketoalcohol such as acetonemethylethylketone, methylisobutyl ketone or diacetone alcohol; an ether such as tetrahydrofuran or dioxane; a polyalkylene glycol such as polyethylene glycol or polypropylene glycol preferably having molecular weights up to 1000 and especially from 100 to 500 such as diethylene glycol and triethylene glycol; an alkylene glycol containing 2 to 6 carbon atoms such as ethylene glycol, propylene glycol, butan-1,4-diol, pentan-1,5-diol and hexan-1,6-diol; a polyol such as glycerol or 1,2,6-hexanetriol; a lower alkyl ether of a polyhydric alcohol such as 2-methoxyethanol, 2-(2-methoxyethoxy)ethanol, 2-(2-ethoxyethoxy)ethanol, 2-[2-(2-methoxyethoxy)ethoxy]ethanol or 2-[2-(2-ethoxyethoxy)ethoxy]-ethanol; a heterocyclic ketone such as 2-pyrrolidone or N-methylpyrrolidone. In all the above solvents the oxygen atoms may be replaced by sulphur atoms where thio equivalents exist. The liquid medium preferably contains from 1 to 5 water-soluble organic solvents, more preferably 1, 2 or 3 such solvents.

Preferred water-soluble organic solvents are selected from lactams, especially 2-pyrrolidone and N-methylpyrrolidone; alkylene glycols or lower alkyl ethers of polyhydric alcohols especially ethylene glycol, diethylene glycol and triethylene glycol and especially 2-methoxy-2-ethoxy-2-ethoxyethanol; and polyethylene glycols having a molecular weight of up to 500. A preferred specific solvent mixture is a binary mixture of water and either diethylene glycol, 2-pyrrolidone or N-methylpyrrolidone in a weight ratio as mentioned above.

The ink jet printing ink may also contain one or more of the following other ingredients (a) a kogation reducing agent to prevent or inhibit the build up of residues (koga) on the resistor surfaces of thermal ink jet printers, and (b) a buffer, such as sodium borate, to stabilise the pH of the ink.

The kogation-reducing agent is preferably an oxo anion, such as described in EP 425150A. The oxo-anion may be $C_2O_4^{2-}$, $SO_3^{2-}$, $SO_4^{2-}$, molybdate, $AsO_4^{3-}$ or more preferably a phosphate ester, a diorganophosphate or more especially a phosphate salt which is particularly effective in reducing kogation. As examples of phosphate salts there may be mentioned dibasic phosphates ($HPO_4^{2-}$), monobasic phosphates ($H_2PO^{4-}$) and polyphosphates ($P_2O_7^{4-}$). The selection of counter ion is not believed to be critical and examples include alkali metals, ammonium and alkylammonium cations. The kogation-reducing agent is preferably present in the ink at a concentration from 0.001% to 15%, based on oxo-anion, and more preferably from 0.01% to 1% (by weight).

The ink preferably contains less than 5%, more preferably less than 2%, especially less than 1% inorganic salts, e.g. NaCl, KCl and $NaNO_3$, in order to enhance solubility of the colorant in the liquid medium and reduce the tendency to deposition of solids in the jets of an ink jet printer. If the colorant contains significant amounts of inorganic salts these may be reduced to a desired level by treating an aqueous solution or suspension of the colorant with a membrane separation process, such as reverse osmosis.

An ink containing the colorant as sole colour material is useful as a component of a range of 3 or 4 primary printing inks (yellow, magenta, cyan and black) for use in trichromatic printing. However, the ink may also contain other coloured materials, especially wet-fast water-soluble coloured materials in addition to the colorant.

The invention also provides a process for ink jet printing a substrate with an ink characterised in that the ink contains a compound of Formula (1) or is as hereinbefore defined. The preferred substrate is a paper.

The invention is illustrated by the following Example in which all parts and percentages are by weight, unless otherwise indicated.

EXAMPLE 1

Preparation of the Compound of Formula (7)

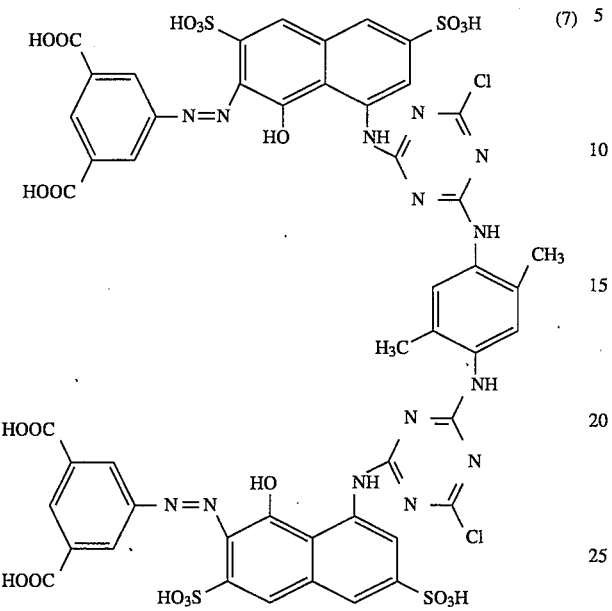

5-Aminoisophthalic acid (9.05g) was stirred in water (500 ml) and the pH adjusted to 8.0 by addition of 2N sodium hydroxide. Sodium nitrite (3.5 g) was added and the solution added to a mixture of a little sulphamic acid to give a diazo suspension.

H-Acid (19.5 g, 0.05M) was added to water (500 ml) and the pH adjusted to 6.0 by addition of 2N sodium hydroxide. A solution of cyanuric chloride (10.0 g) in acetone (100 ml) was added to 0°–10° C. After material and the filtrate added at 0°–10° C. to the above diazo suspension maintaining the pH at 7.0 by addition of 2N sodium hydroxide. The mixture was stirred for 1 hour at 0°–10° C.

2,5-Dimethylphen1,4-ylene diamine (3.2 g) was dissolved in acetone (100 ml) and the solution added to the above mixture. It was stirred for 18 hours at 20°–25° C. maintaining the pH at 6.0–7.0 by addition of 2N sodium hydroxide.

The mixture was heated to 35° C. and salted to 10% with sodium chloride. The product was filtered and washed with 15% sodium chloride solution.

The product was dissolved in water (1l) and heated to 40° C. and slowly acidified to pH 1 with concentrated hydrochloric acid. The product in the form of the free acid was filtered and washed with N hydrochloric acid. It was added to water (1l) and the pH adjusted to 9.0 with concentrated ammonium hydroxide solution. The solution was dialysed until chloride ion could no longer be detected, screened through a 0.45μ filter and then evaporated and dried.

The title compound in the form of its ammonium salt was made into a 1% ink in water/diethylene glycol (92.5/7.5) and printed onto plain paper using a thermal ink jet printer. Bright magenta shades were obtained having high water fastness and good light fastness.

EXAMPLE 2

Preparation of the compound of Formula (8) where R=chloro

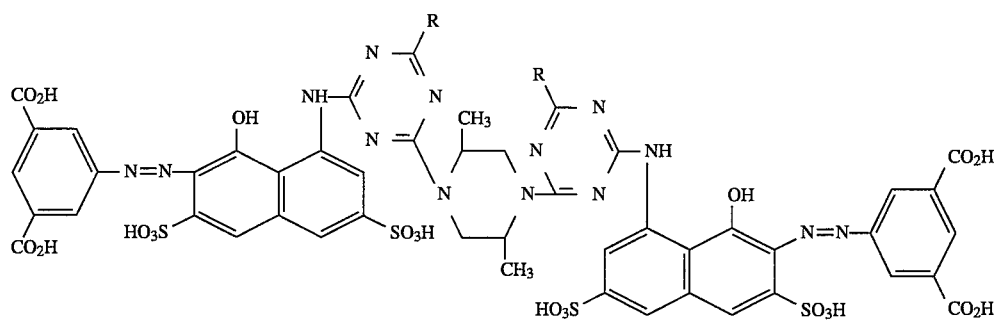

5-Aminoisophthalic acid (18.1 g) was added to water (600 ml) and the pH adjusted to 8.0 by addition of 2N sodium hydroxide solution. Sodium nitrite (7.0 g) was added and the solution added to a mixture of ice/water (100 g) and conc HCl (30 g). The mixture was stirred at 0°–5° C. for 2 hours and excess nitrous acid removed by addition of a little sulphamic acid.

H-Acid (0.1 mol; 39 g) was added to water (800 ml) and the pH adjusted to 6.0 by addition of 2N sodium hydroxide solution. Cyanuric chloride (20 g) was dissolved in acetone (200 ml) and added to stirred ice/water (200 g). The above H-Acid solution was then added at 0°–10° C. over 5 minutes and stirring continued at 0°–10° C. for 2 hours. The solution was screened from a trace insoluble material and added to the above diazo suspension at 0°–10° C. the pH was adjusted to 7.0 by addition of 2N sodium hydroxide solution and stirred for 2 hours at 0°–10° C. and pH 7.0.

To this solution was added 2,5-dimethylpiperazine (5.5 g) and the temperature allowed to rise to 25° C. The pH was maintained at 8.5–9.0 by addition of 2N sodium hydroxide solution. The mixture was stirred for 18 hours at 25° C.

The pH was then adjusted to 7.0 by addition of 2N hydrochloric acid and the product salted out by addition of sodium chloride. It was filtered, washed with saturated sodium chloride solution and dried at 40° C.

The product was converted into the ammonium salt by dissolving in water (10 g in 500 ml water) and adding to N hydrochloric acid (1l). The free acid was filtered off redissolved in water (500 ml) by addition of concentrated ammonium hydroxide solution and reprecipitated by adding to N hydrochloric acid. After filtering, the product was again dissolved in water by addition of ammonium hydroxide solution and the solution dialysed until chloride ions could no longer be detected. The solution was screened through a 0.45μ nylon filter to give a clear solution.

An aliquot of this solution was evaporated and dried at 40° C. to give the title compounds. When this was made into an ink (1%) by dissolving in water/diethylene glycol (92.5/7.5) and printed onto plain paper using a thermal ink jet printer, it gave bright magenta shades with high water fastness.

EXAMPLE 3

Preparation of the compound of Formula (8) where R=hydroxy

The sodium salt of the dye prepared as in Example 2 (10 g) was added to 1N sodium hydroxide solution (200 ml) and the solution stirred and heated at 70° C. for 3 hours. Concentrated hydrochloric acid was then added until the pH was 7.0 and the product filtered off and washed with 10% sodium chloride solution.

This product was dissolved in water and added to 1N hydrochloric acid solution. The free acid was filtered off, redissolved in water by addition of concentrated ammonium hydroxide solution to pH 9 and the solution again added to 1N hydrochloric acid.

After filtering, the product was again dissolved in water by addition of ammonium hydroxide solution and the solution dialysed until no further chloride ions could be detected.

The solution was screened through a 0.45μ nylon filter and then evaporated and dried to give the title compound. When this was made into an ink (1%) by dissolving in water/diethylene glycol (92.5/7.5) and printed onto plain paper using a thermal ink jet printer it gave bright magenta shades with high water fastness.

EXAMPLE 4

Preparation of the compound of Formula (8) where R=2-hydroxyethylamino

The sodium salt of the dye prepared as in Example 2 (10 g) was added to water (200 ml) and 2-hydroxyethylamine (6.0 g) added. The mixture was stirred and heated at 75°–80° C. for 6 hours. Concentrated hydrochloric acid was then added until the pH was 3.0 and the mixture cooled to 20° C. The product was filtered off and converted to the ammonium salt as in Example 3.

When made into an ink (1%) by dissolving in water/diethylene glycol (92.5/7.5) and printed onto plain paper using a thermal ink jet printer it gave bright magenta shades with high water fastness.

EXAMPLE 5

Preparation of the compound of Formula (8) where R=4-methylpiperazino

In place of the 6.0 g of 2-hydroxyethylamine used in Example 4 there was used 5 g of 1-methylpiperazine.

The ammonium salt was made into an ink (1%) by dissolving in water/diethylene glycol (92.5/7.5) and printed onto plain paper using a thermal ink jet printer. It gave bright magenta shades having high water fastness.

EXAMPLE 6

Preparation of the compound of Formula (8) where R=morpholino

In place of 6.0 g of 2-hydroxyethylamine used in Example 4 there was used 6.0 g of morpholine.

The ammonium salt was made into an ink (1%) by dissolving in water/diethylene glycol (92.5/7.5) and printed onto plain paper using a thermal ink jet printer. It gave bright magenta shades with high water fastness.

EXAMPLE 7

Preparation of the compound of Formula (8) where R=methoxy

5-Aminoisophthalic acid (18.1 g) was added to water (600 ml) and the pH adjusted to 8.0 by addition of 2N sodium hydroxide solution. Sodium nitrite (7.0 g) was added and the solution added to a mixture of ice/water (100 g) and concentrated hydrochloric acid (30 g). The mixture was stirred at 0°–5° C. for 2 hours and excess nitrous acid removed by addition of a little sulphamic acid.

N-Acetyl-H-acid (0.1M; 50 g) was added to water (500 ml) and the solution added to the above diazo suspension at 0°–10° C. The pH was adjusted to 7–8 by addition of 2N sodium hydroxide solution and the mixture stirred for 2 hours at 0°–10° C.

To the above mixture was added 47% sodium hydroxide liquor (200 ml) and the solution heated at 70°–75° C. for 3 hours. The solution was neutralised to pH 7.0 by addition of concentrated hydrochloric acid and the mixture cooled to 200° C. Salt, 10% (w/v) was added and the product filtered off, washed with 15% sodium chloride solution and dried.

This monoazo dye (0.03M; 20.5 g) was dissolved in water (600 ml) by addition of 2N sodium hydroxide solution to Ph 8.0. 2,4-Dichloro-6-methoxy-s-triazine (5.4 g) was dissolved in acetone (50 ml) and the solution added to the above monoazo dye solution maintaining the pH at 6–7 with 2N sodium hydroxide solution and a temperature of 25°–30° C. A further 2.5 g of dichloromethoxy-s-triazine was added and stirred further 1 hour at 30° C. The mixture was cooled to 0°–5° C., screened from a trace of insoluble material and the product precipitated by addition of acetone. It was filtered off and dried.

9.18 g (0.01M) of this product was dissolved in water and

The ammonium salt was prepared as in Example 3. When printed onto plain paper using a 1% ink (water/diethylene glycol; 92.5/7.5) it gave bright magenta shades with high water fastness.

EXAMPLE 9

Preparation of the compound of Formula (10) where R=chloro

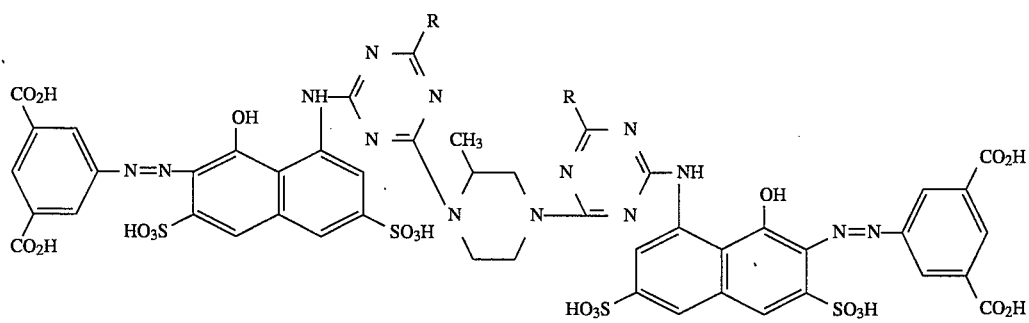

(10)

2,5-dimethylpiperazine (0.55 g) added. The mixture was heated at 70° C. maintaining the pH at 8.5–8.7 by addition of 2N sodium hydroxide solution. After 5 hours the product was salted (20% w/v) and filtered off.

The ammonium salt was made into an ink (1%) by dissolving in water/diethylene glycol (92.5/7.5) and printed onto plain paper using a thermal ink jet printer. It gave bright magenta shades with high water fastness.

If the 2,4-dichloro-6-methoxytriazine is replaced by an equivalent amount of 2,4-dichloro-6-ethoxytraizine the dye of Formula (8) in which R is $ClC_2H_5$ is produced. In the form of the ammonium salt this can be used to prepare inks giving prints of similar brightness and water fastness to the dye in which R is $OCH_3$.

EXAMPLE 8

Preparation of the compound of Formula (9) where R=hydroxy

In place of the 5.5 g of 2,5-dimethylpiperazine used in Example 2 there was used 4.8 g of 2-methylpiperazine. It was converted to the ammonium salt as in Example 2 and then made into an ink (1%) by dissolving in water/diethylene glycol (92.5/7.5). When printed onto plain paper using a thermal ink jet printer it gave bright magenta shades with good water fastness.

EXAMPLE 10

Preparation of the compound of Formula (10) where R=hydroxy

The product of Example 9 was treated with 1N sodium hydroxide solution as in Example 3 to give (10) where R=hydroxy. The ammonium salt was prepared as in

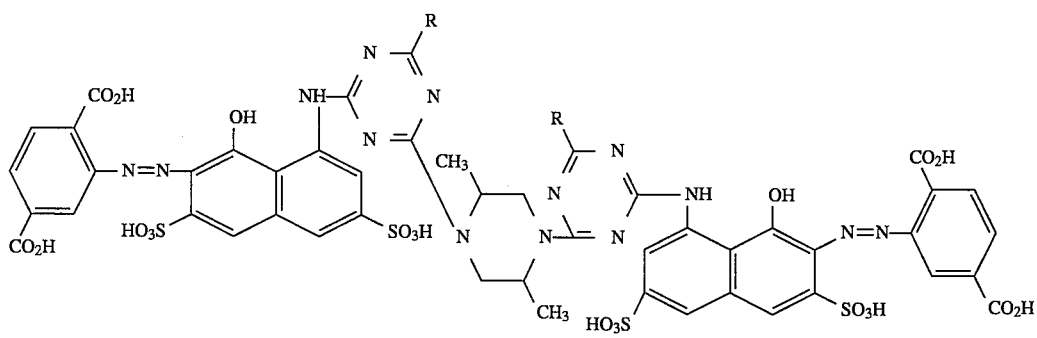

(9)

(a) Preparation of the compound of Formula (9) where R=chloro

In place of the 18.1 g of 5-aminophthalic acid used in Example 2 there was used 18.1 g of 2-aminoterephthalic acid.

(b) The above dyestuff was treated with 1N sodium hydroxide solution as in Example 3 to give (9) where R=hydroxy.

Example 3 and made into an ink (1%) by dissolving in water/diethylene glycol (92.5/7.5). When printed onto plain paper using a thermal ink jet printer it gave bright magenta shades with high water fastness.

EXAMPLE 11

Preparation of the compound of Formula (11)
where R=2-hydroxyethyl amino

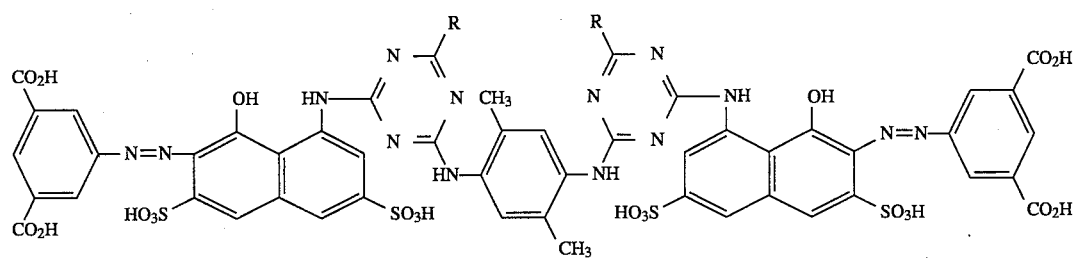

The sodium salt of the dye prepared as in Example 1 (10 g) was added to water (200 ml) and 2-hydroxyethylamine (6.0 g) added. The mixture was stirred and heated at 75°°–80° C. for 6 hours. Concentrated hydrochloric acid was added until the pH was 3.0 and the mixture cooled to 20° C. The product was filtered off and converted to the ammonium salt as in Example 3.

When made into an ink (1%) by dissolving in water/diethylene glycol (92.5/7.5) and printed onto plain paper using a thermal ink jet printer it gave bright magenta shades with good water fastness.

EXAMPLE 12

Preparation of the dye of Formula (11) where
R=3,5-dicarboxyphenyl amino

In place of the 6.0 g of 2-hydroxyethylamine used in Example 11 there was used 3.0 g of 5-aminoisophthalic acid. It was converted to the ammonium salt as in Example 3 and made into an ink (1%) in water/diethyleneglycol (92.5/7.5). When printed onto plain paper using a thermal ink jet printer it gave bright magenta shades with good water fastness.

Further compounds according to Formula 8 or Formula 11 in which the values of R are as set out in the following table may be prepared by replacing the 2-hydroxyethylamine to that used in Example 4 or Example 11 respectively with an equivalent amount of the amine identified in the table.

| Example | Formula | R | Amine |
|---|---|---|---|
| 13 | 8 | —$N(C_2H_4OH)_2$ | di(hydroxyethyl)amine |
| 14 | 8 | —$NHC_4H_9$ | butylamine |
| 15 | 8 | —$N(CH_3)_2$ | dimethylamine |
| 16 | 8 | —$NCH_2Ph$ | benzylamine |
| 17 | 8 | 4-carboxy PhNH— | 4-carboxyphenylamine |
| 18 | 11 | piperidinyl | piperidine |
| 19 | 11 | 4-methylpiperazin-1-yl | 4-methylpiperazine |
| 20 | 11 | 4-tolylamino | 4-tolylamine |
| 21 | 11 | 4-sulphophenylamino | 4-sulphophenylamine |

We claim:

1. A compound of Formula (1) or a salts thereof:

$$Ar^1N\!\!=\!\!N\!\!-\!\!J\!\!-\!\!X\!\!-\!\!L\!\!-\!\!X\!\!-\!\!J\!\!-\!\!N\!\!=\!\!NAr^2 \quad (1)$$

wherein

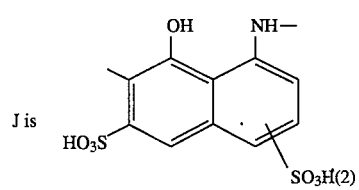

$Ar^1$ and $Ar^2$ are each independently aryl containing at least two carboxy groups; and L is a group of the Formula (3b):

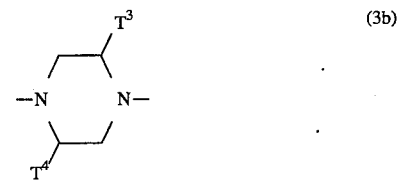

in which $T^3$ and $T^4$ each independently is H, $C_{1-4}$-alkyl, $C_{1-4}$-alkoxy or $C_{3-4}$-alkenyl provided that $T^3$ and $T^4$ are not both H;

each X independently is a group of the Formula (4), (5) or (6):

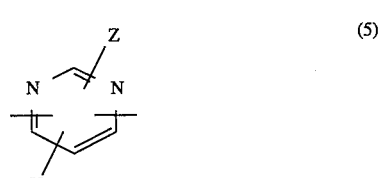

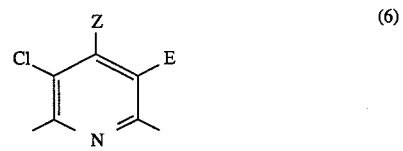

each Z independently is H, halogen, alkyl, $NR^1R^2$, $SR^3$ or $OR^3$;

each Y independently is Z, $SR^4$ or $OR^4$;

each E independently is Cl or CN; and $R^1$, $R^2$, $R^3$ and $R^4$ are each independently H, alkyl, substituted alkyl, alkenyl, substituted alkenyl, cycloalkyl, aryl, substituted, aryl, aralkyl or substituted aralkyl, or $R^1$ and $R^2$, together with the nitrogen atom to which they are attached, form a 5 or 6 membered ring.

2. A compound according to claim 1 wherein L is of Formula 3(b) and $T^3$ and T4 each independently is H, $C_{1-4}$-alkyl or $C_{3-4}$-alkenyl provided that $T^3$ and $T^4$ are not both H.

3. A compound according to claim 1 or claim 2 wherein L is 2,5-dimethylpiperazin-1,4-ylene.

4. A compound according to any one of claims 1 to 3 wherein J is of Formula (2) in which the $SO_3H$ groups are in the 3,6-positions.

5. A compound according to any one of claims 1 to 4 wherein $Ar^1$ and $Ar^2$ are both 3,5-dicarboxyphenyl.

6. A compound according to any one of claims 1 to 5 wherein each X is of the Formula (4) in which Z is H, halogen, $C_{1-4}$-alkyl, $NR^1R^2$, $SR^3$ or $OR^3$.

7. A compound according to claim 6 wherein Z is selected from H, $OR^3$, $NR^1R^2$, morpholin-1-yl, piperidin-1-yl, piperazin-1-yl and substituted piperazin-1-yl.

8. A compound according to claim 6 or claim 7 wherein $R^1$ is H, $C_{1-4}$-alkyl, phenyl, carboxyphenyl, dicarboxyphenyl or hydroxy-$C_{2-4}$-alkyl, $R^2$ is H, $C_{1-4}$-alkyl or hydroxy $C_{2-4}$-alkyl and $R^3$ is H or $C_{1-4}$-alkyl.

9. A compound according to any one of claims 6 to 8 wherein Z is selected from Cl, OH, SH, $C_{1-4}$-alkoxy, mono- or di-$C_{1-6}$-alkylamino mono- di-(hydroxy-$C_{2-4}$-alkyl)amino, carboxylalkylamino, phenylamino, 3- or 4-carboxyphenylamino, 3,5-, 3,4- or 2,4-dicarboxyphenylamino, benzylamino, morpholin-1-yl, piperidin-1-yl, piperazin-1-yl, 4-$C_{1-4}$-alkylpiperazin-1-yl, 4(hydroxy-$C_{2-4}$-alkyl)piperazin-1-yl.

10. The compound of claim 1 wherein $Ar^1$ and $Ar^2$ are both 3,5-dicarboxyphenyl;

each J is of Formula (2) in which the sulpho groups are in the 3,6-positions;

each X is of Formula (4) in which Z is Cl, $NR^1R^2$ or $OR^3$;

and L is 2,5-dimethylpiperazin-1,4-ylene;

in the form of its ammonium, methylammonium or dimethylammonium salt.

11. The compound of claim 1 wherein $Ar^1$ and $Ar^2$ are both 3,5-dicarboxyphenyl;

each J is of Formula (2) in which the sulpho groups are in the 3,6-positions;

each X is of Formula (4) in which Z is Cl, $NR^1R^2$ or $OR^3$;

and L is 2-methylpiperazin-1,4-ylene;

in the form of its ammonium, methylammonium or dimethylammonium salt.

12. A compound according to anyone of claims 1 to 12 wherein Z is selected from Cl, —OH, —$OCH_3$ and —$NHCH_2CH_2OH$.

13. A compound according to any one of claims 1 to 12 in the form of an ammonium, substituted ammonium or alkali metal salt or a mixture of such salts.

14. An ink comprising a solution of a compound according to claim 13 in an aqueous medium.

15. An ink according to claim 14 wherein the aqueous medium comprises a mixture of water and one or more water-miscible organic solvents in the ratio 95:5 to 50:50.

16. An ink according to claim 14 or claim 15 containing from 1% to 6% by weight of said compound.

* * * * *